United States Patent
Brensinger

(10) Patent No.: US 11,299,905 B2
(45) Date of Patent: Apr. 12, 2022

(54) COMBINATION RAISED TENT AND TENT PLATFORM

(71) Applicant: NEMO EQUIPMENT, INC., Dover, NH (US)

(72) Inventor: Camon Brensinger, Stratham, NH (US)

(73) Assignee: Nemo Equipment, Inc., Dover, NH (US)

( * ) Notice: Subject to any disclaimer, the term of this patent is extended or adjusted under 35 U.S.C. 154(b) by 0 days.

(21) Appl. No.: 16/983,036

(22) Filed: Aug. 3, 2020

(65) Prior Publication Data

US 2021/0040765 A1    Feb. 11, 2021

Related U.S. Application Data

(60) Provisional application No. 62/882,762, filed on Aug. 5, 2019.

(51) Int. Cl.
*E04H 15/06* (2006.01)
*B60P 3/38* (2006.01)

(52) U.S. Cl.
CPC ............... *E04H 15/06* (2013.01); *B60P 3/38* (2013.01)

(58) Field of Classification Search
CPC ... E04H 15/06; B60R 9/04; B60P 3/38; B60P 3/39; B60P 3/341
See application file for complete search history.

(56) References Cited

U.S. PATENT DOCUMENTS

| | | | | |
|---|---|---|---|---|
| 3,995,649 A | * | 12/1976 | Robichaud | E04H 15/06 135/133 |
| 4,109,954 A | * | 8/1978 | Wall | B60P 3/341 135/88.13 |
| 4,830,036 A | * | 5/1989 | Sanders | E04H 15/06 135/132 |
| 6,102,468 A | * | 8/2000 | Lowrey | B60P 3/341 296/169 |
| 6,192,909 B1 | * | 2/2001 | Strausser | E04H 15/40 135/116 |
| 6,669,269 B1 | * | 12/2003 | Tran-Ngoc | B60P 3/341 296/156 |
| 8,671,963 B2 | * | 3/2014 | Shih | E04H 15/60 135/90 |
| 9,624,688 B1 | * | 4/2017 | Tyson | B60P 3/39 |
| 10,849,321 B2 | * | 12/2020 | Peel | E04H 3/28 |
| 10,890,010 B1 | * | 1/2021 | Chang | B60P 3/341 |
| 2017/0240089 A1 | * | 8/2017 | Tait | E04H 15/06 |
| 2017/0349080 A1 | * | 12/2017 | Sautter | B60P 3/34 |

FOREIGN PATENT DOCUMENTS

DE    102013011933 A1 *  1/2015  ............. E04H 15/56

* cited by examiner

*Primary Examiner* — David R Dunn
*Assistant Examiner* — Danielle Jackson

(57) ABSTRACT

A rooftop tent/platform rooftop habitat is used as a shelter or sleeping area on the roof top of a vehicle, such as a passenger vehicle, truck or military vehicle. The rooftop habitat includes a tent portion as well as a rooftop mounted platform portion. The rooftop mounted platform portion may be a foldable platform semi-permanently or temporarily attached to the roof of the vehicle and may extend at least partially out from the roof of the vehicle. The tent portion is separate from the platform and may be assembled and used on the ground in the manner of a traditional tent or assembled and raised to the platform located on the roof top of the vehicle. The tent is made to fit the platform but is removable from and useable without the platform.

9 Claims, 4 Drawing Sheets

COMBINATION RAISED TENT AND TENT PLATFORM

CROSS-REFERENCE TO RELATED APPLICATIONS

This application claims priority from U.S. Provisional Patent application No. 62/882,762 filed Aug. 5, 2019 titled Motor Vehicle Rooftop Tent and Tent Platform, which application is fully incorporated herein by reference.

TECHNICAL FIELD

The present invention relates to outdoor equipment and products and more particularly, relates to tents and tent components for use raised on a vehicle or the like.

BACKGROUND INFORMATION

Rooftop Tents which allow a user to sleep with and/or on their vehicle rooftop are very convenient and known. The prior art rooftop tents include a tent-like structure that is large enough to sleep at least one person and which is permanently attached to a platform that is either permanently or temporarily attached to the roof of a vehicle.

The problem with such prior art rooftop tents is that they are extremely heavy (typically weighing over 100 pounds) and bulky which makes them very difficult to install and remove on the rooftop of a vehicle. Such weight also affects logistics of shipping and merchandising the products. In the case of a platform that is generally permanently mounted to the roof of the car, that much weight and volume on the roof so far above the axles of the vehicle significantly affects vehicle handling and fuel efficiency. In addition, a large platform permanently mounted to the roof of the vehicle prevents the vehicle from carrying other products on its roof including bicycles, kayaks or the like. Finally, the prior art rooftop tent designs do not allow the tent to be separated from the platform and thus used independently of the platform on the ground when desired.

Accordingly, what is needed is a rooftop tent comprising a platform which can be mounted either permanently or temporarily to the roof of the vehicle or otherwise raised off the ground. The platform should be configured to transform in shape in order to pack small enough to occupy only a fraction of the roof when not in use or removed completely from the roof and transported apart from being on the roof, leaving room for bikes, skis or other items to be transported using a roof rack system. A separate tent should be included which can be setup on the ground and used on the ground or setup on the ground and then lifted to the rooftop platform for mating with the platform, making setup of the rooftop tent easier and adding versatility for the user. Such a two-piece rooftop tent construction benefits merchandising and shipping logistics, installation and removal from the vehicle and vehicle handling and performance. The tent and platform can also potentially come from different suppliers and/or different brands.

SUMMARY OF THE INVENTION

The present invention features a combination tent and raised platform comprising a platform portion, configured for being mounted raised from ground level and a tent portion, separate and apart from the platform portion, and configured for being used at ground level separate from the platform portion and for being temporarily and releasably secured to the platform portion. In one embodiment, the platform portion is configured for being temporarily and removably mounted on a roof of a vehicle while in another embodiment, the platform portion is configured for being temporarily and removably mounted on a cargo bed of a vehicle.

In the preferred embodiment, the platform portion is foldable and the tent portion is a freestanding tent and configured for being assembled at the ground level and raised to and releasably secured to the platform portion.

The platform portion is configured for being mounted on a vehicle selected from the group of vehicles consisting of an automobile, a motor cycle, a truck, a camper, a Recreational Vehicle (RV), an all-terrain vehicle and a boat while the combination tent and raised platform are configured for placement and use on a raised floor.

In another embodiment, the combination tent and raised platform, comprises a platform portion, configured for being mounted raised from ground level, wherein the platform portion is foldable and a tent portion, separate and apart from the platform portion, and configured for being assembled and used at ground level separate from the platform portion, and for being temporarily and releasably secured to the platform portion.

In yet another embodiment, the combination tent and raised platform comprises a platform portion, configured for being mounted raised from ground level onto a vehicle, wherein the platform portion is foldable, wherein the platform portion is configured for being mounted on a vehicle selected from the group of vehicles consisting of an automobile, a motor cycle, a truck, a camper, a Recreational Vehicle (RV), an all-terrain vehicle and a boat, and a tent portion, separate and apart from the platform portion, and configured for being assembled and used at ground level separate from the platform portion, and for being temporarily and releasably secured to the platform portion.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 3:
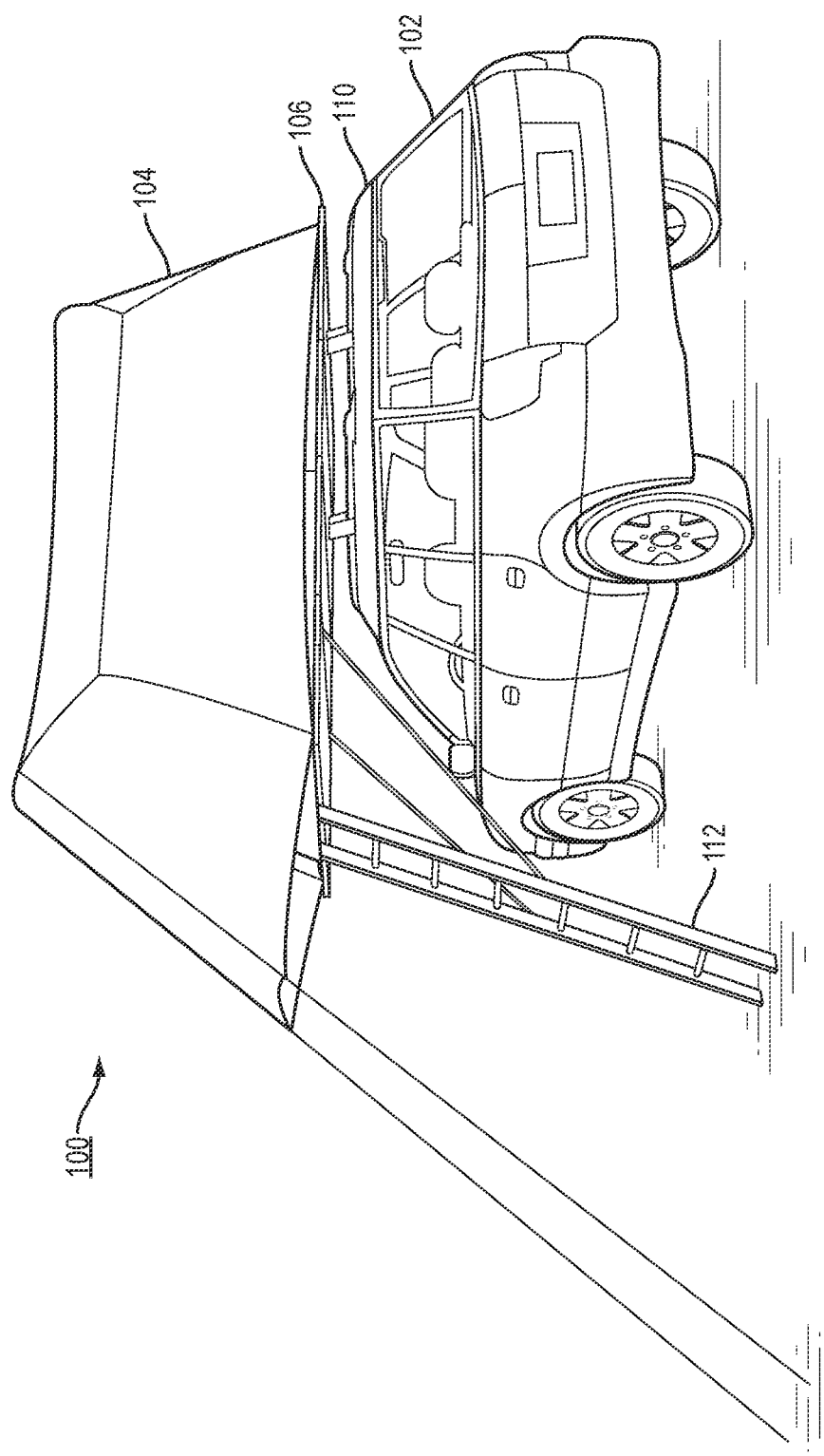
FIG. 3 is a drawing illustrating the tent portion mated with the rooftop mounted platform of the rooftop tent according to one embodiment of the present invention.

In the preferred embodiment of the present invention, a rooftop tent 100, FIG. 3, is used as a shelter or sleeping area when combined with a vehicle 102, such as a passenger vehicle, truck or military vehicle. The present invention may also be used on a platform mounted above the ground on supports, stilts or the like such as a hunting platform, or potentially on the roof of boats or any other type of vehicle, object or place in which the platform portion may be mounted raised from the ground and on which a tent may be temporarily attached. The rooftop tent 100 includes a tent portion 104 mounted to a separate platform portion 106 to which the tent portion 104 will be mounted.

Figure 2:
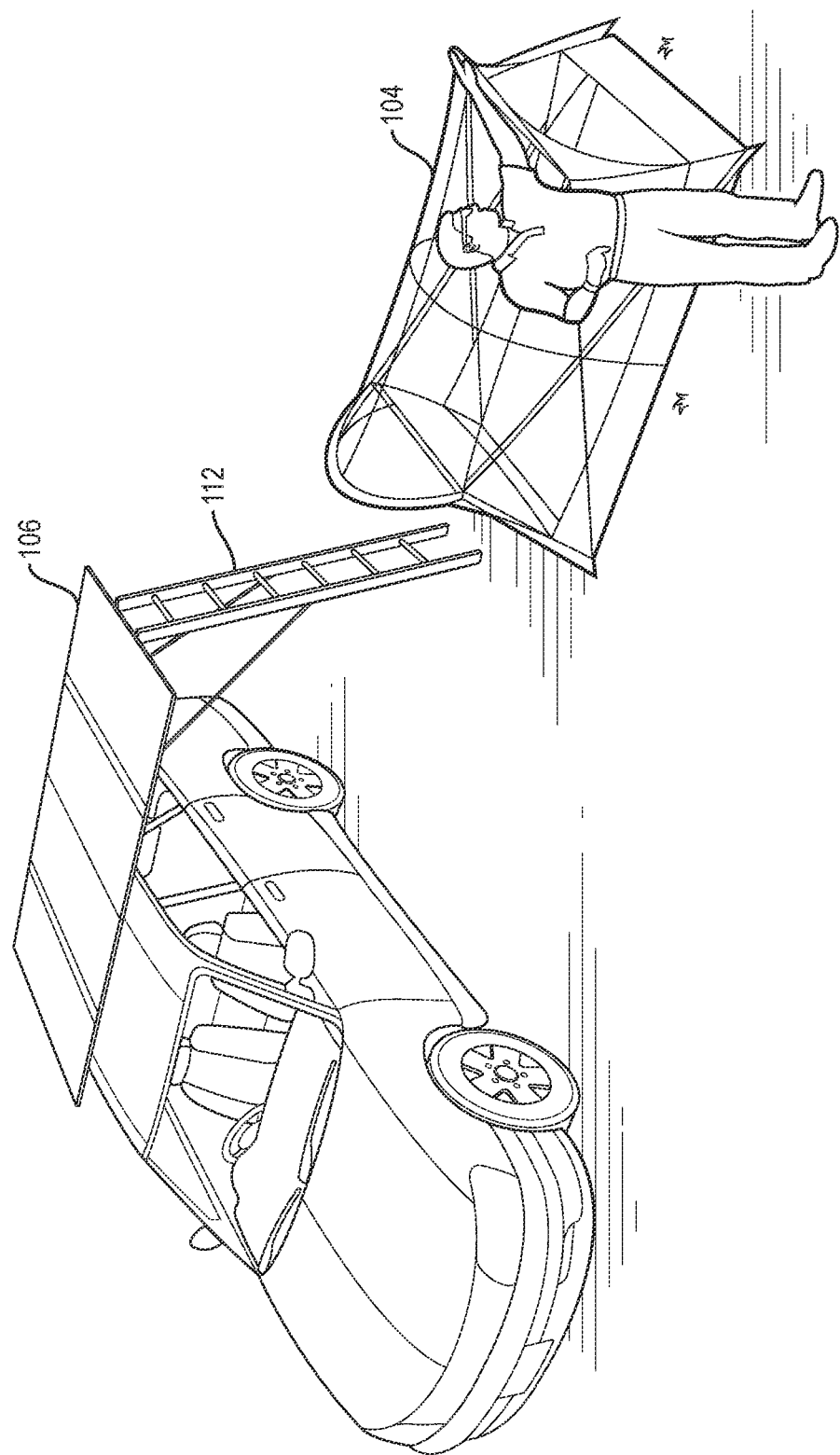
FIG. 2 is a drawing illustrating the setup of a tent structure on the ground prior to meeting with the roof platform in accordance with the teachings of the present invention.

The tent portion 104, as shown in FIGS. 2-3, is at least partially supported by a platform 106 mounted to the roof 110 of a vehicle 102. The tent portion 104 includes one or more doors and once mounted on the rooftop platform 106, is accessible by means of a portable/removable ladder 112. The tent portion 104 is designed for use with the platform, has matching dimensions, and includes a secure method of attaching to the platform. In other words, the tent is purpose-built to work with the platform but is not permanently attached to the platform and may be used off the platform on the ground as well as on the platform.

Figure 1:
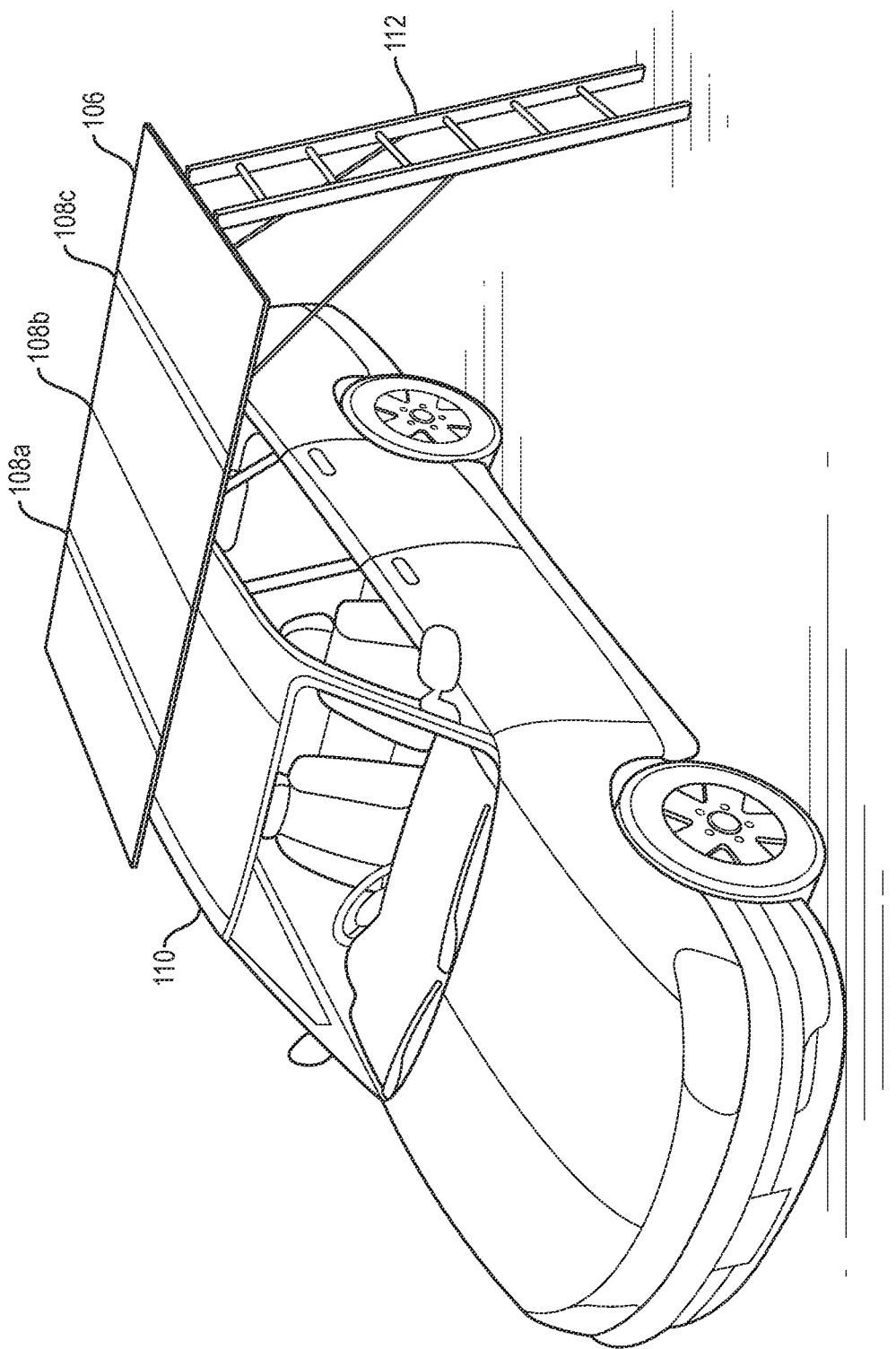
FIG. 1 is a drawing of a foldable/collapsible roof platform for use with the rooftop tent in accordance with one embodiment of the present invention.
Figure 4:
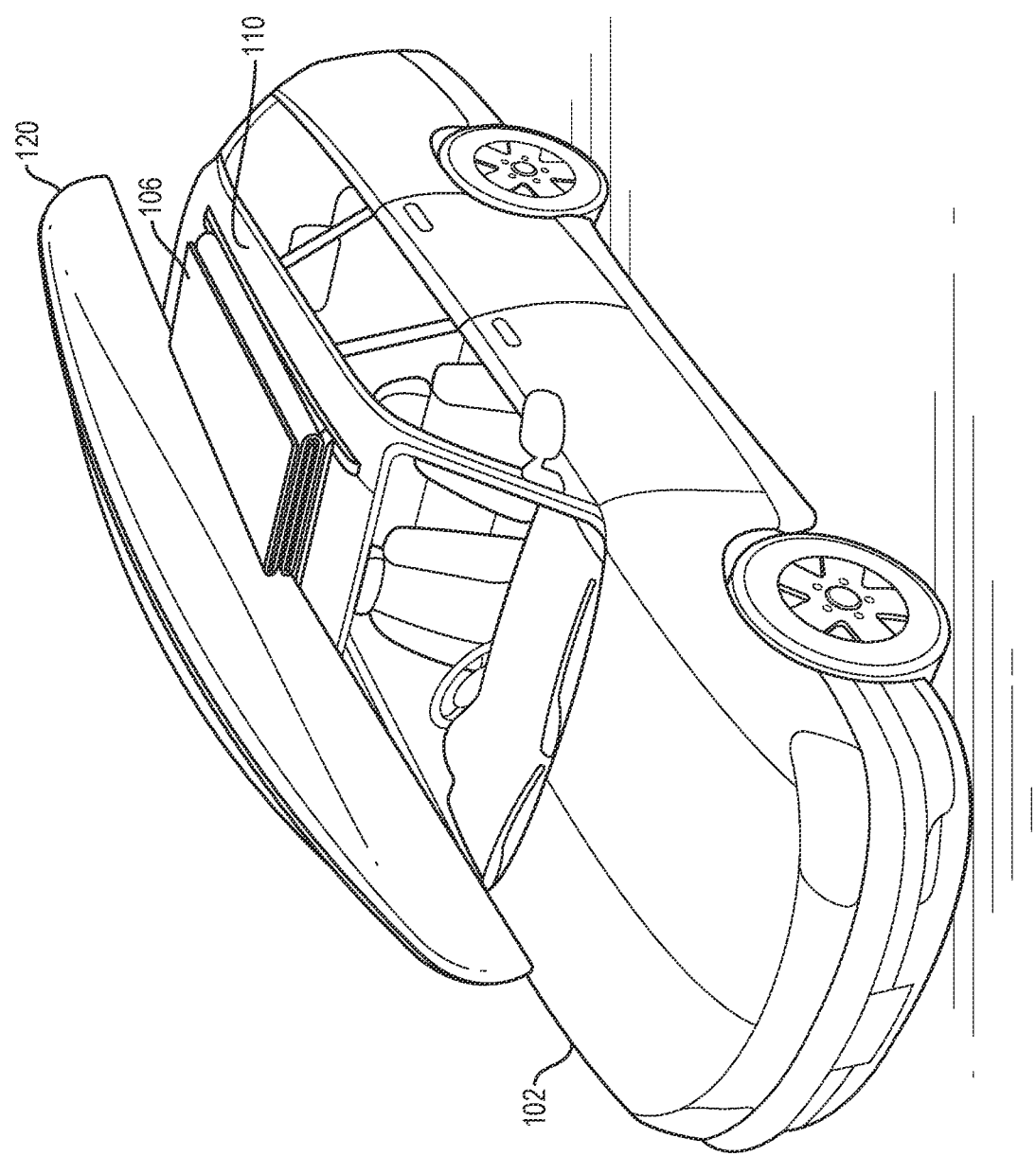
FIG. 4 is a drawing illustrating the roof mounted platform of the invention in a folded position on a vehicle's rooftop, allowing room for another rooftop mounted item such as a canoe.

The platform 106, FIGS. 1 and 4 is, in the preferred embodiment, foldable along fold lines 108 to make the platform smaller and more aerodynamic if it is mounted permanently/semi-permanently to the roof of the vehicle or alternatively, making the platform 106 small enough to store inside the vehicle and to be easily installed on to the roof of the vehicle and folded outwardly during use. The platform may fold into an enclosure which improves the aerodynamics and appearance and may include additional storage. As shown in FIG. 4, the platform may be folded along the 3 fold lines 108 into a size one-fourth the size of the deployed platform 106, allowing room on the rooftop of a vehicle 110 for another item such as a canoe 120 or some other device such as a kayak, bicycle, storage box or the like.

Appropriate supports are provided as needed and known to those skilled in the art. In addition, a ladder 112 is provided to allow the user to access the rooftop tent comprising a tent mounted on to a platform. The platform 106 may be attached or supported to the roof 110 of the vehicle 102 using any well-known method including a roof rack, cast or stamped metal brackets, or any other method well-known to those skilled in the art for supporting a platform on the roof of the vehicle.

In use, the tent portion 104, FIG. 2 is preferably first erected on the ground. Freestanding tents are preferred for use with the rooftop platform 106 of the present invention. As previously stated, the tent portion 104 is purpose-built but shares the features typical of a traditional camping tent. It may be assembled and used on the ground without a rooftop platform 106 or assembled and placed onto the rooftop platform 106, as shown in FIG. 3 for example. The tent portion 104 may be attached to the platform portion 106 utilizing any manner of well-known interconnection methods including mating fasteners, snaps, clasps, shock-cords or the like. Keeping the tent portion 104 and its users off the ground is advantageous for a sense of security, getting above uneven ground, or protecting from wet or snowy ground. The rooftop tent of the present invention keeps the user dry and may also prevent unwanted wildlife from entering the tent portion 104.

It is to be understood that the combination tent and raised vehicle platform according to the present invention may in place of being removably mounted onto the roof of a vehicle, may also be removably mounted to a raised but non-roof portion of a vehicle, such as the cargo bed of a pickup truck or a motor cycle, a truck, a camper, a Recreational Vehicle (RV), an all-terrain vehicle and a boat.

Modifications and substitutions by one of ordinary skill in the art are considered to be within the scope of the present invention, which is not to be limited except by the allowed claims and their legal equivalents.

What is claimed is:

1. A combination tent and raised platform, comprising:
   a tent platform, configured, in a deployed position, for being mounted to a vehicle rooftop, said tent platform sized and configured for accommodating a tent mounted to said tent platform, wherein said tent platform is foldable from said deployed position mounted to said vehicle to said vehicle rooftop and having a stored width, said stored width approximately one-fourth of said deployed width, said stored width configured for allowing the placement of objects adjacent said tent platform when in said stored position mounted to said vehicle rooftop; and
   a tent, separate and apart from said tent platform, and configured, in a first configuration, for being used at ground level separate from said tent platform and configured, in a second configuration, for also being temporarily and releasably secured to said tent platform when said tent platform is in said deployed position mounted to said vehicle rooftop, for use as a raised tent.

2. The combination tent and raised platform of claim 1, wherein said tent platform is foldable to said stored width along three fold lines into said one-fourth of said deployed width.

3. The combination tent and raised platform of claim 1, wherein said tent is configured for being assembled at ground level and raised to and releasably secured with said tent platform mounted to said vehicle rooftop.

4. The combination tent and raised platform of claim 3, wherein said tent is a freestanding tent.

5. The combination tent and raised platform of claim 1, wherein said tent platform is configured for being mounted on a vehicle selected from the group of vehicles consisting of an automobile, a truck, a camper, a Recreational Vehicle (RV), an all-terrain vehicle and a boat.

6. The combination tent and raised platform of claim 5, wherein said tent platform is mounted to a vehicle rooftop rack previously mounted to said vehicle rooftop.

7. A combination tent and raised platform, comprising:
   a tent platform, configured, in a deployed position, for being mounted to a vehicle rooftop rack previously mounted to a vehicle rooftop, said tent platform sized and configured for accommodating a tent mounted to said tent platform, wherein said tent platform is foldable long three fold lines from said deployed position mounted to said vehicle rooftop and having a deployed width into a stored position mounted to said vehicle rooftop and having a stored width, said stored width approximately one-fourth of said deployed width, said stored width configured for allowing the placement of objects adjacent said tent platform when in said stored position mounted to said vehicle rooftop; and
   a tent, separate and apart from said tent platform, wherein said tent is a free standing tent configured for being assembled at ground level and configured, in a first configuration, for being used at ground level separate from said tent platform and configured, and in a second configuration, for being raised to and temporarily and releasably secured to said tent platform when said tent platform is in said deployed position mounted to said vehicle rooftop, for use as a raised tent.

8. The combination tent and raised platform of claim 7, wherein said tent platform is configured for being mounted on a vehicle selected from the group of vehicles consisting of an automobile, a truck, a camper, a Recreational Vehicle (RV), an all-terrain vehicle and a boat.

9. A combination tent and raised platform, comprising:

a tent platform, configured, in a deployed position, for being mounted to a vehicle raised from ground level, said tent platform sized and configured for accommodating a tent mounted to said tent platform, wherein said tent platform is foldable long three fold lines from said deployed position mounted to said vehicle and having a deployed width into a stored position mounted to said vehicle and having a stored width, said stored width approximately one-fourth of said deployed width, said stored width configured for allowing the placement of objects adjacent said tent platform when in said stored position mounted to said vehicle, wherein said tent platform is configured for being mounted on a vehicle selected from the group of vehicles consisting of an automobile, a truck, a camper, a Recreational Vehicle (RV), an all-terrain vehicle and a boat; and a tent, separate and apart from said tent platform, wherein said tent is a free standing tent configured for being assembled at ground level and configured, in a first configuration, for being used at ground level separate from said tent platform and configured, in a second configuration, for being raised to and temporarily and releasably secured to said tent platform when said tent platform is in said deployed position mounted to said vehicle, for use as a raised tent.

* * * * *